United States Patent
Narang et al.

(10) Patent No.: US 11,711,728 B2
(45) Date of Patent: *Jul. 25, 2023

(54) WIRELESS ACCESS NETWORK ELEMENT STATUS REPORTING

(71) Applicant: T-MOBILE INNOVATIONS LLC, Overland Park, KS (US)

(72) Inventors: Pawankumar C. Narang, Herndon, VA (US); Deveshkumar Narendrapratap Rai, Overland Park, KS (US); Murali Krishnan Govindan, Broadlands, VA (US); Satish Gobarbhai Thumar, Overland Park, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/741,775

(22) Filed: May 11, 2022

(65) Prior Publication Data
US 2022/0272579 A1   Aug. 25, 2022

Related U.S. Application Data

(63) Continuation of application No. 17/004,480, filed on Aug. 27, 2020, now Pat. No. 11,395,187.

(51) Int. Cl.
*H04W 28/12* (2009.01)
*H04W 28/08* (2023.01)
(Continued)

(52) U.S. Cl.
CPC .......... *H04W 28/12* (2013.01); *H04B 7/0689* (2013.01); *H04L 41/064* (2013.01);
(Continued)

(58) Field of Classification Search
CPC ............. H04W 28/12; H04W 28/0908; H04W 28/0967; H04B 7/0689; H04L 41/0609;
(Continued)

(56) References Cited

U.S. PATENT DOCUMENTS 8,831,587 B2 * 9/2014 Pollakowski ......... H04L 41/082
455/418
8,861,494 B2   10/2014 Mukhopadhyay
(Continued)

*Primary Examiner* — Nishant Divecha

(57) ABSTRACT

A wireless communication network manages a wireless access node. The wireless access node wirelessly exchanges user data with wireless User Equipment (UEs) and exchanges the user data with one or more network elements. The wireless access node generates status indicators that characterize wireless access node operation during the user data exchanges. An Element Management System (EMS) determines EMS load based on EMS operation and transfers load data that indicates the EMS load for delivery to the wireless access node. The wireless access node receives the load data transferred by the EMS. The wireless access node identifies individual priorities for individual ones of the status indicators. The wireless access node determines individual reporting times for the individual ones of the status indicators based on the load data and the individual priorities. The wireless access node transfers the individual ones of the status indicators to the EMS per the individual reporting times.

20 Claims, 9 Drawing Sheets

(51) Int. Cl.
*H04L 41/0604* (2022.01)
*H04L 41/0631* (2022.01)
*H04L 41/0681* (2022.01)
*H04L 41/069* (2022.01)
*H04B 7/06* (2006.01)

(52) U.S. Cl.
CPC ........ *H04L 41/069* (2013.01); *H04L 41/0609* (2013.01); *H04L 41/0681* (2013.01); *H04W 28/0908* (2020.05); *H04W 28/0967* (2020.05)

(58) Field of Classification Search
CPC . H04L 41/064; H04L 41/0681; H04L 41/069; H04L 43/065; H04L 43/067; H04L 43/0817
See application file for complete search history.

(56) References Cited

U.S. PATENT DOCUMENTS

| | | | |
|---|---|---|---|
| 8,908,507 B2 | 12/2014 | Kovvali et al. | |
| 9,414,248 B2 | 8/2016 | Kovvali et al. | |
| 9,967,753 B1* | 5/2018 | Jadunandan | H04W 4/24 |
| 2013/0290230 A1* | 10/2013 | Bodog | H04L 43/16 706/14 |
| 2014/0050090 A1* | 2/2014 | Nordstrom | H04W 28/0236 370/232 |
| 2016/0080965 A1* | 3/2016 | Boyle | H04W 48/00 370/252 |
| 2018/0035321 A1* | 2/2018 | Zhang | H04W 24/08 |
| 2019/0268278 A1 | 8/2019 | Kaitha et al. | |
| 2020/0350960 A1* | 11/2020 | Black | H04B 17/318 |
| 2021/0400505 A1* | 12/2021 | Komlev | H04L 41/069 |

\* cited by examiner

US 11,711,728 B2

WIRELESS ACCESS NETWORK ELEMENT STATUS REPORTING

RELATED CASES

This United States patent application is a continuation of U.S. patent application Ser. No. 17/004,480 that was filed on Aug. 27, 2020 and is entitled "WIRELESS ACCESS NETWORK ELEMENT STATUS REPORTING." U.S. patent application Ser. No. 17/004,480 is hereby incorporated by reference into this United States patent application.

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless communication networks have wireless access network elements which exchange wireless signals with the wireless user devices using wireless network protocols. Exemplary wireless network protocols include Fifth Generation New Radio (5GNR), Millimeter-Wave (MMW), Long Term Evolution (LTE), Institute of Electrical and Electronic Engineers (IEEE) 802.11 (WIFI), and Low-Power Wide Area Network (LP-WAN). The wireless communication networks have other network elements like controllers and gateways that deliver the wireless data service along with the wireless access network elements.

The wireless communication networks use network element management systems like Element Management Systems (EMS) and Operational Support Systems (OSS) to manage the network elements. The network elements generate status data that characterizes their operations like event counts, threshold violations, and Key Performance Indicators (KPIs). The network elements transfer their counts, violations, and KPIs to their network element management system. The network element management system filters and formats the status data. The network element management system applies the filtered and formatted status data to processing systems link intelligent networks to generate useful information. The status indicators may be organized into groups. Exemplary groups comprise 5GNR, LTE, LP-WAN, and the like. Exemplary status indicators comprise processing occupancy, memory capacity, throughput, user connections, signal-to-interference/noise ratio, packet delay, packet counts, call counts, excessive drop rate, excessive user connections, and the like.

The introduction of new wireless protocols like 5GNR and LP-WAN have led to the massive deployment of new status indicators. Unfortunately, the massive amount of the new status indicators can overwhelm the network element management systems. Although the reporting of the status indicators may be throttled on a per-group basis, the group-based flow control of the status indicators is inefficient and ineffective given the massive data increase.

TECHNICAL OVERVIEW

A wireless communication network manages a wireless access node. The wireless access node wirelessly exchanges user data with wireless User Equipment (UEs) and exchanges the user data with one or more network elements. The wireless access node generates status indicators that characterizes wireless access node operation during the user data exchanges. An Element Management System (EMS) determines EMS load based on EMS operation and transfers load data that indicates the EMS load for delivery to the wireless access node. The wireless access node receives the load data transferred by the EMS. The wireless access node identifies individual priorities for individual ones of the status indicators. The wireless access node determines individual reporting times for the individual ones of the status indicators based on the load data and the individual priorities. The wireless access node transfers the individual ones of the status indicators to the EMS per the individual reporting times.

DETAILED DESCRIPTION

Figure 1:
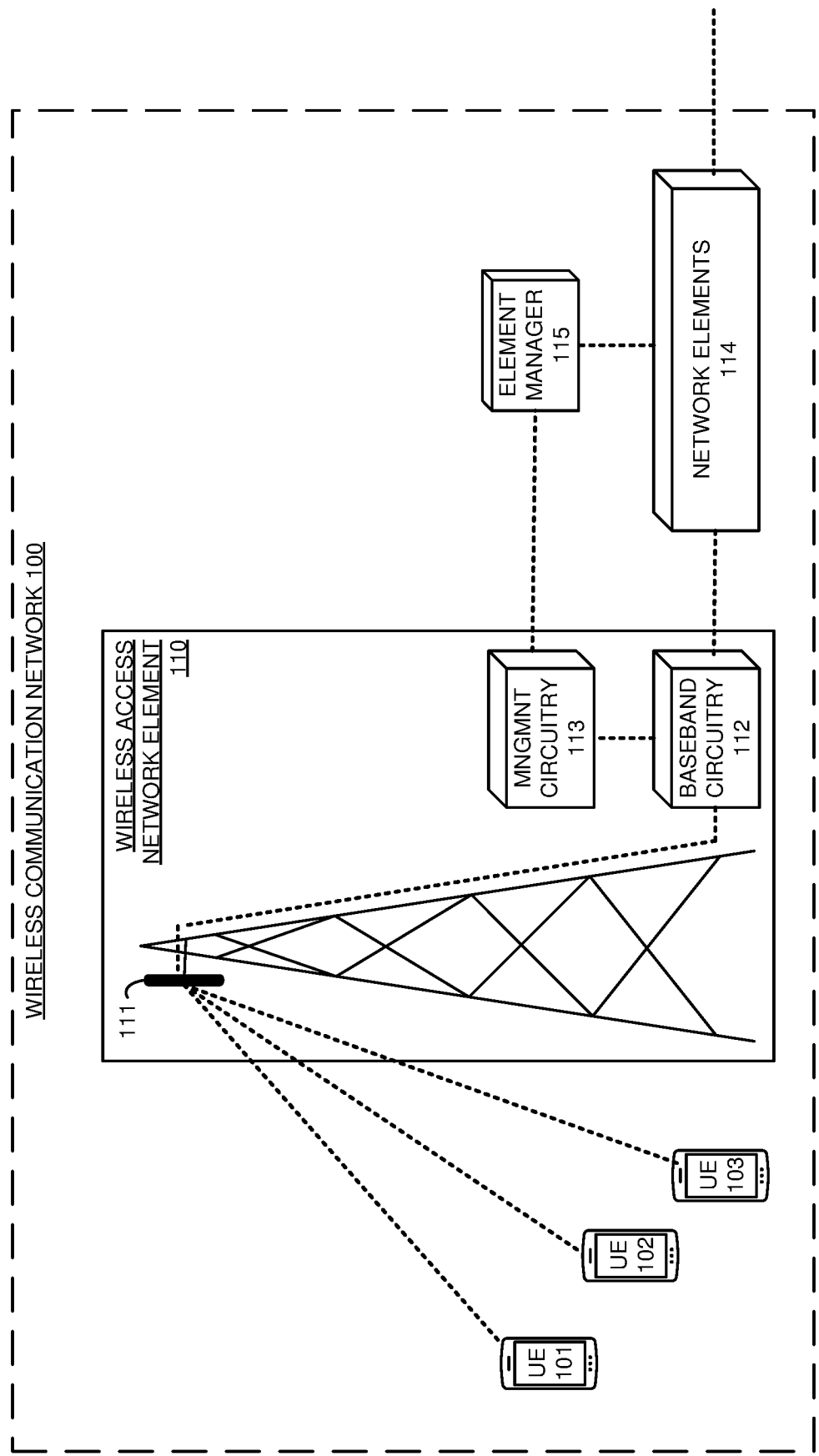
FIG. 1 illustrates a wireless communication network having a wireless access network element that indicates element status to an element manager.

FIG. 1 illustrates wireless communication network 100 having wireless access network element 110 that indicates element status to network element manager 115. Wireless communication network 100 delivers wireless data services like internet-access, video-calling, media-streaming, augmented-reality, machine-control, and/or some other wireless networking product. Wireless communication network 100 comprises wireless UEs 101-103, wireless access network element 110, network elements 114, and element manager 115. Wireless access network element 110 comprises radio 111, baseband circuitry 112, and management (MNGMNT) circuitry 113.

Various examples of network operation and configuration are described herein. In some examples, radio 111 wirelessly exchanges user data with wireless User Equipment (UEs) 101-103. Radio 111 exchanges the user data with baseband circuitry 112. Baseband circuitry 112 exchanges the user data with network elements 114. Network elements 114 may exchange the user data with external systems like the internet. Radio 111 and baseband circuitry 112 generate status indicators that characterize radio 111 and baseband circuitry 112 during these user data exchanges. Radio 111 transfers its status indicators to baseband circuitry 112. Baseband circuitry 112 transfers these status indicators and its own status indicators to management circuitry 113. Management circuitry 113 processes the status indicators to identify individual priorities for the individual status indicators. Management circuitry 113 receives load data from element manager 115. Management circuitry 113 processes the load data and the individual priorities to determine individual reporting times for the individual status indicators. Management circuitry 113 transfers the individual status indicators to element manager 115 per the individual reporting times. Thus, management circuitry 113 transfers some status indicators immediately and stores/monitors the other status indicators for subsequent transfer to element manager 115.

Advantageously, wireless access network element 110 reports its status indictors using an individual flow-control mechanism that efficiently and effectively responds to the load of network element manager 115. The status indicators characterizes operations like event counts, threshold violations, and Key Performance Indicators (KPIs). The status indicators may be organized into groups like 5GNR, LTE, LP-WAN, and the like. Exemplary status indicators comprise processing occupancy, memory capacity, throughput, user connections, signal-to-interference/noise ratio, packet delay, packet counts, call counts, excessive drop rate, excessive user connections, and the like.

UEs 101-103 wirelessly communicate with wireless access network element 110 over wireless links. The wireless links use Radio Access Technologies (RATs) like Fifth Generation New Radio (5GNR), Millimeter-Wave (MMW), Long Term Evolution (LTE), Institute of Electrical and Electronic Engineers (IEEE) 802.11 (WIFI), Low-Power Wide Area Network (LP-WAN), and/or some other protocol. The wireless links use electromagnetic frequencies in the low-band, mid-band, high-band, or some other portion of the electromagnetic spectrum. Wireless access network element 110 communicates with other network elements 114 over data links. Network elements 114 communicate with external systems like the internet over data links. The data links use metal, glass, air, or some other media. The data links use IEEE 802.3 (Ethernet), Time Division Multiplex (TDM), Data Over Cable System Interface Specification (DOCSIS), Internet Protocol (IP), 5GC, 5GNR, LTE, WIFI, virtual switching, inter-processor communication, bus interfaces, and/or some other data communication protocols.

Although wireless network elements are described herein, wireline network elements like modems, routers, and gateways could implement status indicator reporting in a similar manner to wireless access network element 110. Although UEs 101-103 are depicted as smartphones, UEs 101-103 might instead comprise computers, robots, vehicles, or some other data appliances with wireless communication circuitry. Radio 111 is depicted as a tower, but radio 111 may use other mounting structures or no mounting structure at all. Wireless access network element 110 may comprise gNodeBs, eNodeBs, hot-spots, base-stations, and/or some other form of wireless network transceiver. Network elements 114 comprise Access and Mobility Management Functions (AMFs), User Plane Functions (UPFs), MMW controllers, Mobility Management Entities (MMEs), Gateways (GWs), Internet-of-Things (IoT) application servers, content-delivery servers, and/or some other form of wireless network apparatus. In some examples, network elements 114 (possibly including element manager 115) comprise Virtual Network Functions (VNFs) in a Network Function Virtualization Infrastructure (NFVI).

UEs 101-103 and wireless access network element 110 comprise antennas, amplifiers, filters, modulation, analog/digital interfaces, microprocessors, software, memories, transceivers, bus circuitry, and the like. Network elements 114 and element manager 115 comprise microprocessors, memories, software, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, network applications, and management applications. The microprocessors retrieve the software from the memories and execute the software to drive the operation of wireless communication network 100 as described herein.

Figure 2:
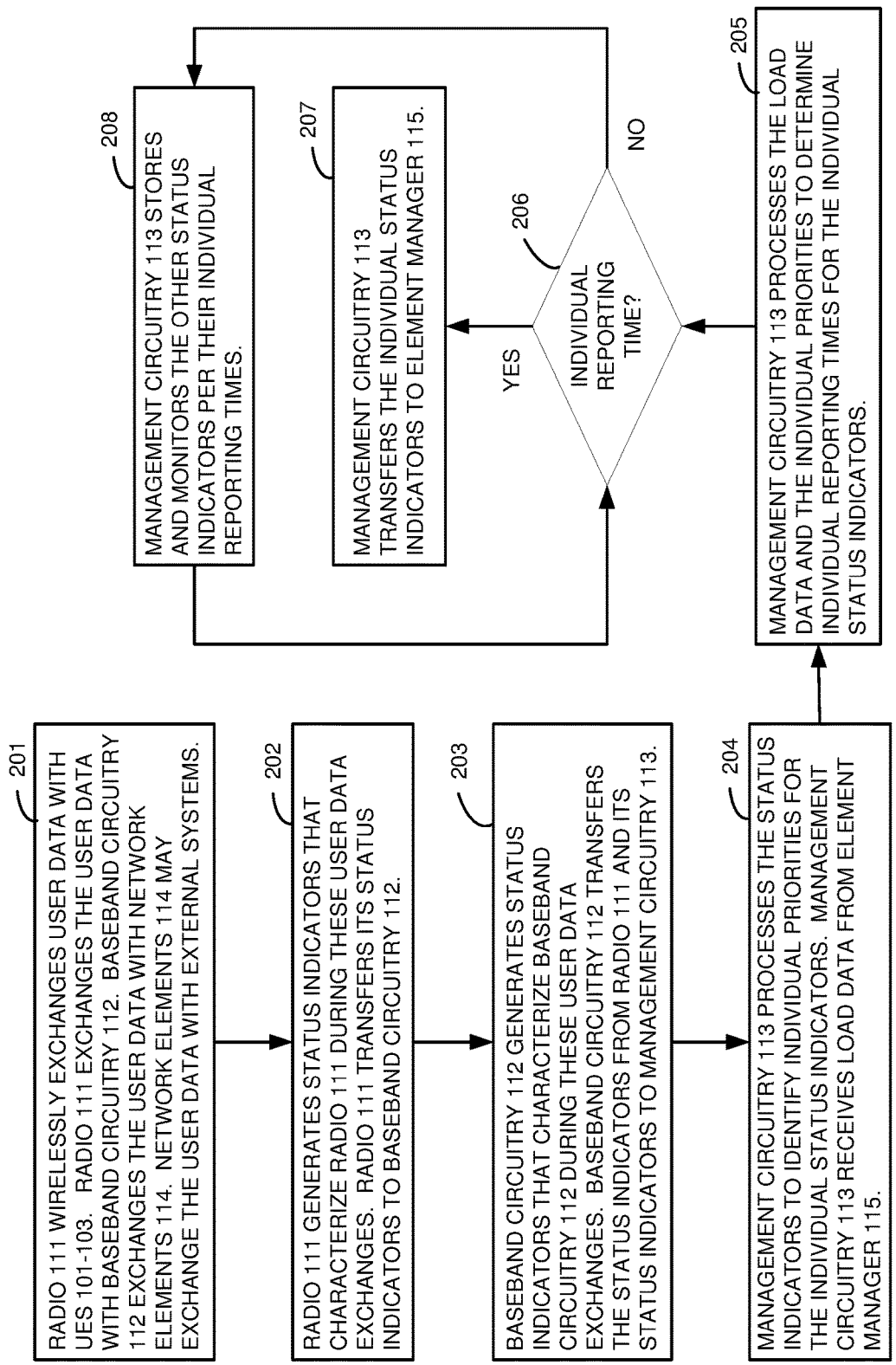
FIG. 2 illustrates an exemplary operation of the wireless communication network having the wireless access network element to indicate element status to the element management system.

FIG. 2 illustrates an exemplary operation of wireless communication network 100 having wireless access network element 110 to indicate element status to element manager 115. Radio 111 wirelessly exchanges user data with UEs 101-103 (201). Radio 111 exchanges the user data with baseband circuitry 112 (201). Baseband circuitry 112 exchanges the user data with network elements 114 (201). Network elements 114 may exchange the user data with external systems (201). Radio 111 generates status indicators that characterize radio 111 during these user data exchanges and transfers its status indicators to baseband circuitry 112 (202). Baseband circuitry 112 generates status indicators that characterize baseband circuitry 112 during these user data exchanges (203). Baseband circuitry 112 transfers the status indicators from radio 111 and its own status indicators to management circuitry 113 (203). Management circuitry 113 processes the status indicators to identify individual priorities for the individual status indicators (204). For example, management circuitry 113 may host a data structure that translates individual status indicator IDs into individual and associated reporting priorities. Management circuitry 113 receives load data from element manager 115 (204). The load indicator might comprise a description, code, integer, analog signal, digital data, machine-readable data, human-readable data, or some other form of status data. Management circuitry 113 processes the load data and the individual priorities to determine individual reporting times for the individual status indicators (205). The reporting times might be now, midnight, upon satisfaction of a condition, never, or some other reporting instruction. Management circuitry 113 determines when the reporting times occur for the individual status indicators given the current load of element manager 115 (206). When the reporting time occurs for an individual status indicator (206), management circuitry 113 immediately transfers the individual status indicator to element manager 115 and the operation ends (207). When the reporting time has not occurred for an individual status indicator (206), management circuitry 113 stores the individual status indicator and monitors the reporting condition and load for subsequent transfer (208). The operation repeats until the status indicator is transferred or discarded (206-208).

Figure 3:
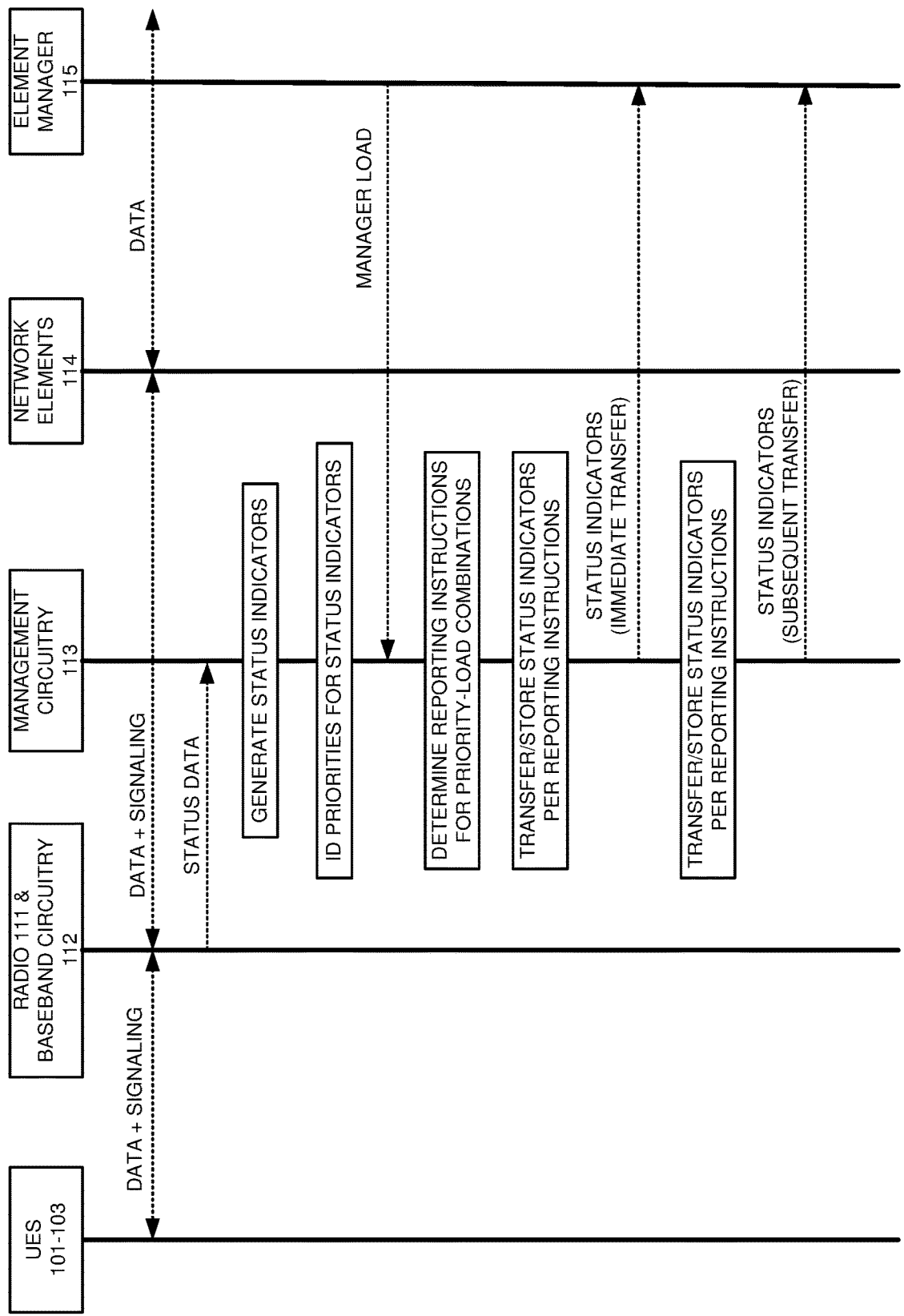
FIG. 3 illustrates an exemplary operation of the wireless communication network having the wireless access network element to indicate element status to the element management system.

FIG. 3 illustrates an exemplary operation of wireless communication network 100 having wireless access network element 110 to indicate element status to element manager 115. UEs 101-103 wirelessly exchange user data and network signaling with radio 111 which exchanges the user data and network signaling with baseband circuitry 112. Baseband circuitry 112 exchanges network signaling and the user data with network elements 114 which may exchange the user data with external systems like the internet. Radio 111 and baseband circuitry 112 generate status indicators that characterize radio 111 and baseband circuitry 112 during these user data exchanges. Radio 111 transfers its status indicators to baseband circuitry 112, and baseband circuitry 112 transfers the radio status indicators and its own status indicators to management circuitry 113. Management circuitry 113 processes the status indicators to identify individual priorities for the individual status indicators. Management circuitry 113 receives load data from element manager 115. Management circuitry 113 processes the load data and the individual priorities to determine individual reporting times for the individual status indicators—including conditional reporting times. Management circuitry 113 immediately transfers some of the individual status indicators to element manager 115 per the individual reporting times. Management circuitry 113 stores and may subsequently transfer the other individual status indicators to element manager 115 per their individual reporting times.

Figure 4:
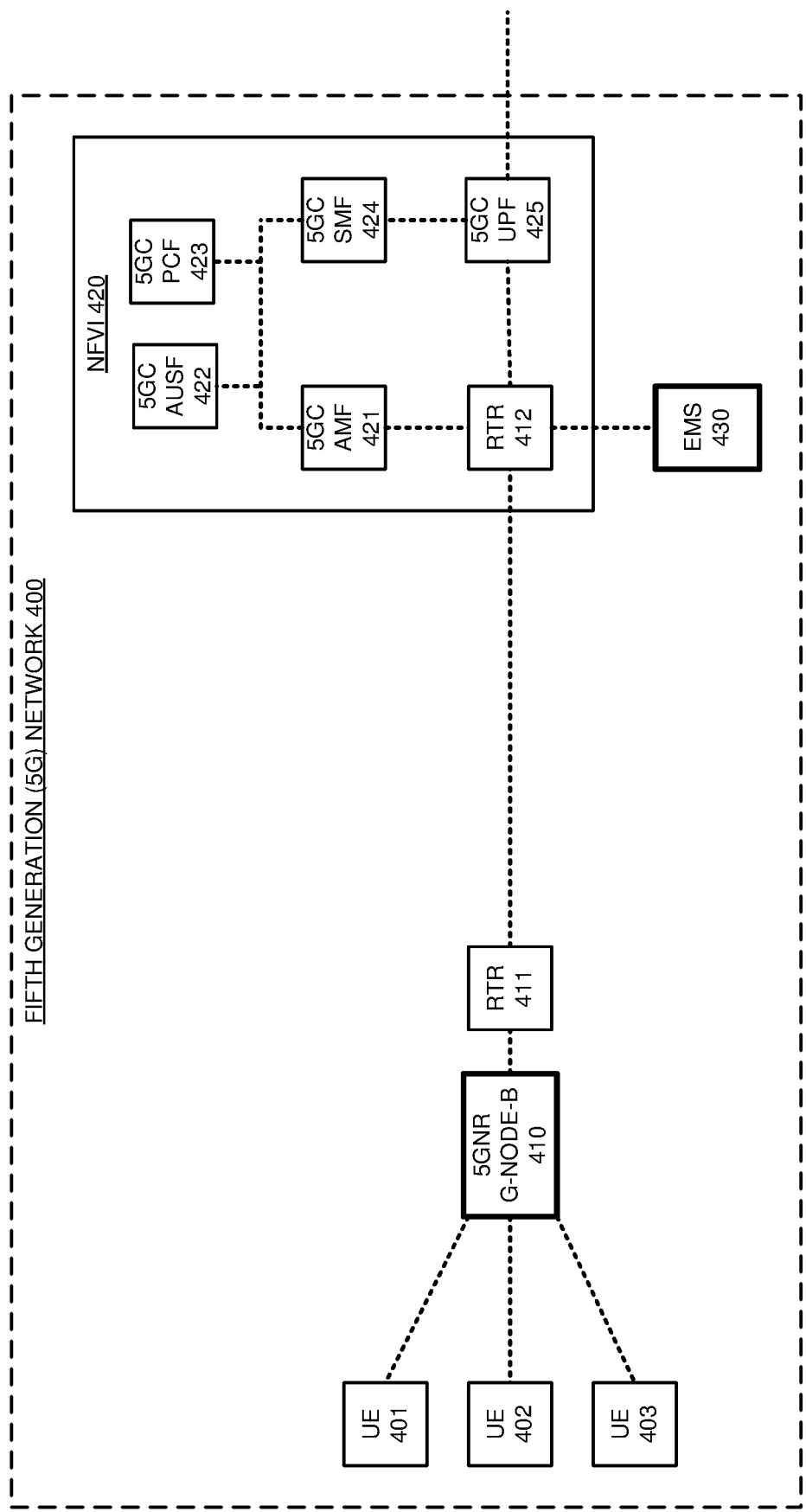
FIG. 4 illustrates a Fifth Generation (5G) network having a 5G New Radio (5GNR) gNodeB that indicates element status to an element management system.

FIG. 4 illustrates Fifth Generation (5G) network 400 having 5G New Radio (5GNR) gNodeB 410 that indicates element status to an Element Management System (EMS) 430. 5G network 400 comprises an example of wireless communication network 100, although network 100 may differ. 5G network 400 comprises UEs 401-403, Fifth Generation New Radio (5GNR) gNodeB 410, Network Function Virtualization Infrastructure (NFVI) 420, and Element Management System (EMS) 430. 5GNR gNodeB 410 is coupled to NFVI 420 and EMS 430 over router (RTR) 411 and router 412. NFVI 420 comprises router 412, Fifth Generation Core (5GC) Access and Mobility Management Function (AMF) 421, 5GC Authentication and Security Function (AUSF) 422, 5GC Policy Control Function (PCF) 423, 5GC Session Management Function (SMF) 424, 5GC User Plane Function (UPF) 425. FIG. 4 is simplified for clarity, and additional routers may be used between 5GNR gNodeB 410, 5GC AMF 421, 5GC UPF 425, and EMS 430.

UE 401 wirelessly attaches to 5GNR gNodeB 410 and they wirelessly exchange 5GNR attachment signaling. 5GNR gNodeB 410 and 5GC AMF 421 exchange N2 attachment signaling over routers 411-412. 5GC AMF 421 exchanges 5GC signaling with 5GC AUSF 422, 5GC PCF 423, and 5GC SMF 424 to authenticate and authorize UE 101 and to select services and QoS for UE 101. 5GC SMF 424 signals UPF 425 to serve UE 401 over 5GNR gNodeB 410 per the QoS. 5GC AMF 421 signals 5GNR gNodeB 410 to serve UE 401 per the QoS. 5GNR gNodeB 410 signals UE 401 indicating the selected services and QoS. UE 101 and 5GNR gNodeB 410 wirelessly exchange data to deliver the selected services per the QoS. 5GNR gNodeB 410 and UPF 425 exchange the data over routers 411-412 to deliver the selected services per the QoS. UPF 425 exchanges the data with external systems to deliver the selected services per the QoS. UEs 402-403 and typically many more UEs receive wireless data services from 5GNR gNodeB 410 in a similar manner as UE 401.

During the data exchanges, 5GNR gNodeB 410 counts events, detects threshold violations, and generates Key Performance Indicators (KPIs). Exemplary events for counting include calls, drops, packets, handovers, handover failures, and the like. Exemplary thresholds for violation detection include user connections, memory capacity, and the like. Exemplary KPIs include CPU occupancy, average data throughput, antenna configuration, and the like. 5GNR gNodeB 410 stores individual reporting priorities for the individual event counts, threshold violations, and KPIs. EMS 430 generates an EMS indicator that indicates its load like transactions per unit time—or an integer whose magnitude correlates to the transactions per unit time. EMS 430 transfers the EMS indicator to 5GNR gNodeB 410. 5GNR gNodeB 410 receives the EMS indicator from EMS 430 that indicates the load. Based on the EMS indicator, 5GNR gNodeB 410 translates the individual reporting priorities for the individual event counts, threshold violations, and KPIs into individual reporting instructions for the individual event counts, threshold violations, and KPIs. 5GNR gNodeB 410 transfers the individual event counts, threshold violations, and KPIs to EMS 430 per their individual reporting instructions. The reporting instructions may drive 5GNR gNodeB 410 to report the status indicator immediately, never, or later. EMS 430 receives and processes the event counts, threshold violations, and KPIs. EMS 430 updates and transfers its EMS indicator to 5GNR 410.

Figure 5:
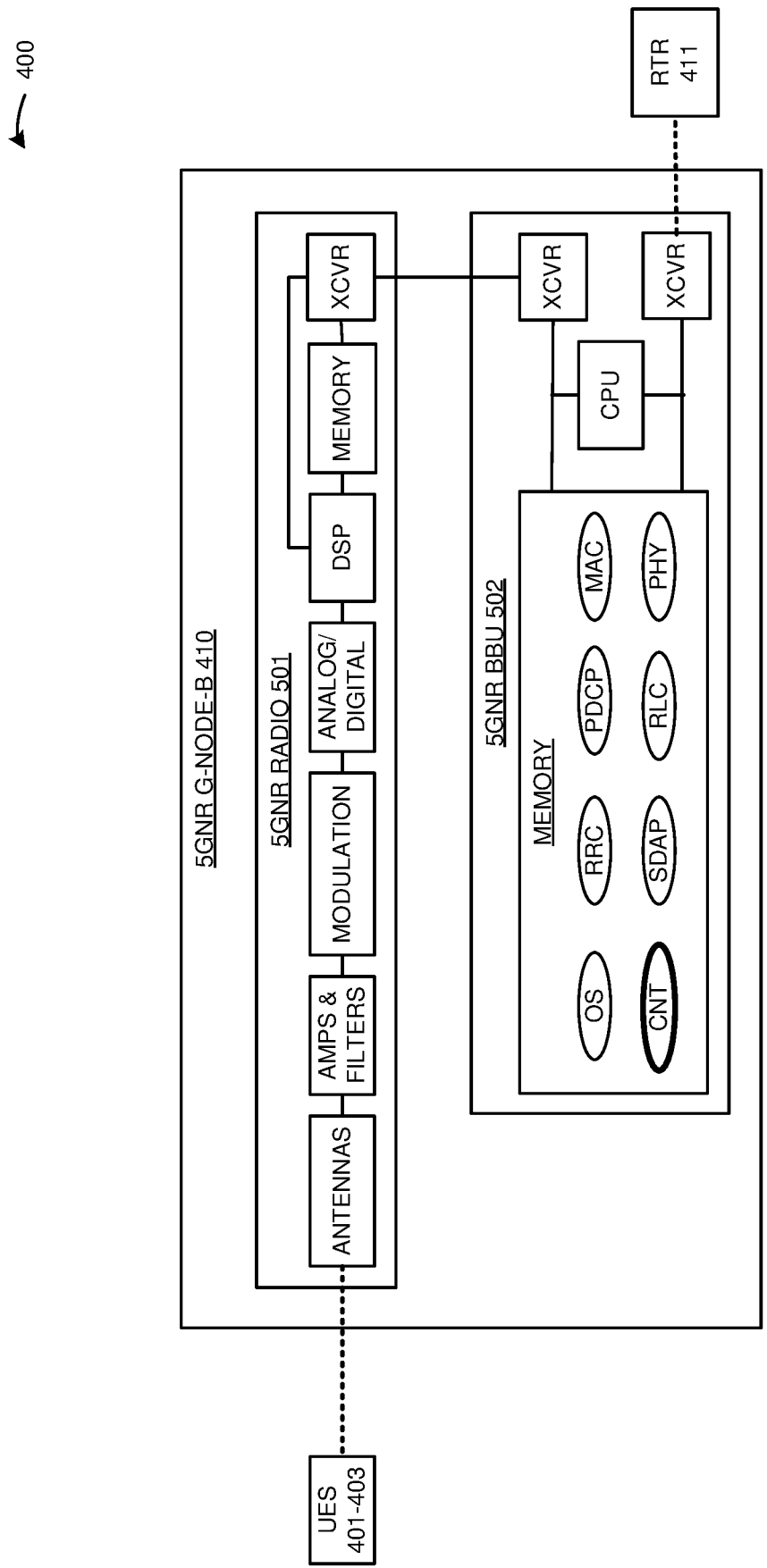
FIG. 5 illustrates the 5GNR gNodeB that indicates element status to the element management system.

FIG. 5 illustrates 5GNR gNodeB 410 that indicates element status to EMS 430. 5GNR gNodeB 410 comprises an example of wireless access network element 110, although network element 110 may differ. 5GNR gNodeB 410 comprises 5GNR radio 501 and 5GNR Baseband Unit (BBU) 502. 5GNR radio 501 comprises antennas, amplifiers, filters, modulation, analog-to-digital interfaces, DSP, memory, and transceivers that are coupled over bus circuitry. 5GNR BBU 502 comprises memory, CPU, and transceivers that are coupled over bus circuitry. The memory in 5GNR BBU 502 stores an operating system (OS) and network applications like Physical Layer (PHY), Media Access Control (MAC), Radio Link Control (RLC), Packet Data Convergence Protocol (PDCP), Radio Resource Control (RRC), Service Data Adaptation Protocol (SDAP), EMS controller (CNT). UEs 401-403 are wirelessly coupled to the antennas in 5GNR radio 501 over 5GNR links. A transceiver in 5GNR radio 501 is coupled to a transceiver in 5GNR BBU 502 over data links. A transceiver in 5GNR BBU 503 is coupled to router 411 over data links. The CPU in 5GNR BBU 502 executes the operating system, PHY, MAC, RLC, PDCP, SDAP, and RRC to exchange 5GNR signaling and data with UEs 401-403 and to exchange 5G Core (5GC) signaling and data with NFVI 420 over router 411.

In radio 501, the antennas receive 5GNR signals from UEs 401-403 that transport UL signaling and UL data. The antennas transfer corresponding electrical UL signals through duplexers to the amplifiers. The amplifiers boost the received UL signals for filters which attenuate unwanted energy. Demodulators down-convert the UL signals from their carrier frequency. The analog/digital interfaces convert the analog UL signals into digital UL signals for the DSPs. The DSPs recover UL symbols from the UL digital signals. The CPUs execute the network applications to process the UL symbols and recover the UL signaling and the UL data. The RRCs processes the UL signaling and DL signaling (from AMF 421) to generate new UL signaling and new DL signaling. The RRCs transfer the new UL signaling to AMF 421 over router 411. The SDAPs transfer corresponding UL data to UPF 425 over router 411.

In 5GNR BBU 502, the RRC receives DL signaling from AMF 421 over router 411. The SDAP receives DL data from UPF 425 over router 411. The 5GNR network applications process the new DL signaling and the DL data to generate corresponding DL symbols that carry the DL signaling and DL data. In radio 501, the DSP processes the DL symbols to generate corresponding digital signals for the analog-to-digital interfaces. The analog-to-digital interfaces convert the digital DL signals into analog DL signals for modulation. Modulation up-converts the DL signals to their carrier frequency. The amplifiers boost the modulated DL signals for the filters which attenuate unwanted out-of-band energy. The filters transfer the filtered DL signals through duplexers to the antennas. The electrical DL signals drive the antennas to emit corresponding wireless signals to UEs 401-403 that transport the DL signaling and DL data.

RRC functions comprise authentication, security, handover control, status reporting, Quality-of-Service (QoS), network broadcasts and pages, and network selection. SDAP functions include packet marking and QoS enforcement. PDCP functions comprise security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid Automatic Repeat Request (HARM), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/de-matching, scrambling/descrambling, modulation mapping/de-mapping, channel estimation/equalization, Fast Fourier Transforms (FFTs)/Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping.

The components of 5GNR radio 501 count events, detect threshold violations, and generate KPIs. For example, the DSP may count downlink 5GNR symbols. The components of 5GNR BBU 502 also count events, detect threshold violations, and generate KPIs. For example, the CPU may indicate when its usage exceeds 90% or indicate transceiver data rates. The CPU executes the operating system, PHY, MAC, RLC, PDCP, SDAP, and RRC to count events, detect threshold violations, and generate KPIs. For example, the MAC may indicate available resource blocks. The CPU in BBU 502 executes the operating system to obtain and transfer these event counts, threshold violations, and KPIs to the EMS controller.

The CPU in BBU 502 executes the operating system and the EMS controller in BBU 502 receives the EMS indicator from EMS 430. The EMS controller and its supporting CPU, memory, transceivers, and bus are examples of management circuitry 113, although management circuitry 113 may differ. Based on the EMS indicator, the EMS controller translates the individual reporting priorities for the individual event counts, threshold violations, and KPIs into individual reporting instructions. The EMS controller transfers the individual event counts, threshold violations, and KPIs to EMS 430 over router 411 per their individual reporting instructions. The reporting instructions may drive the EMS controller to report status data based on time or condition.

Figure 6:
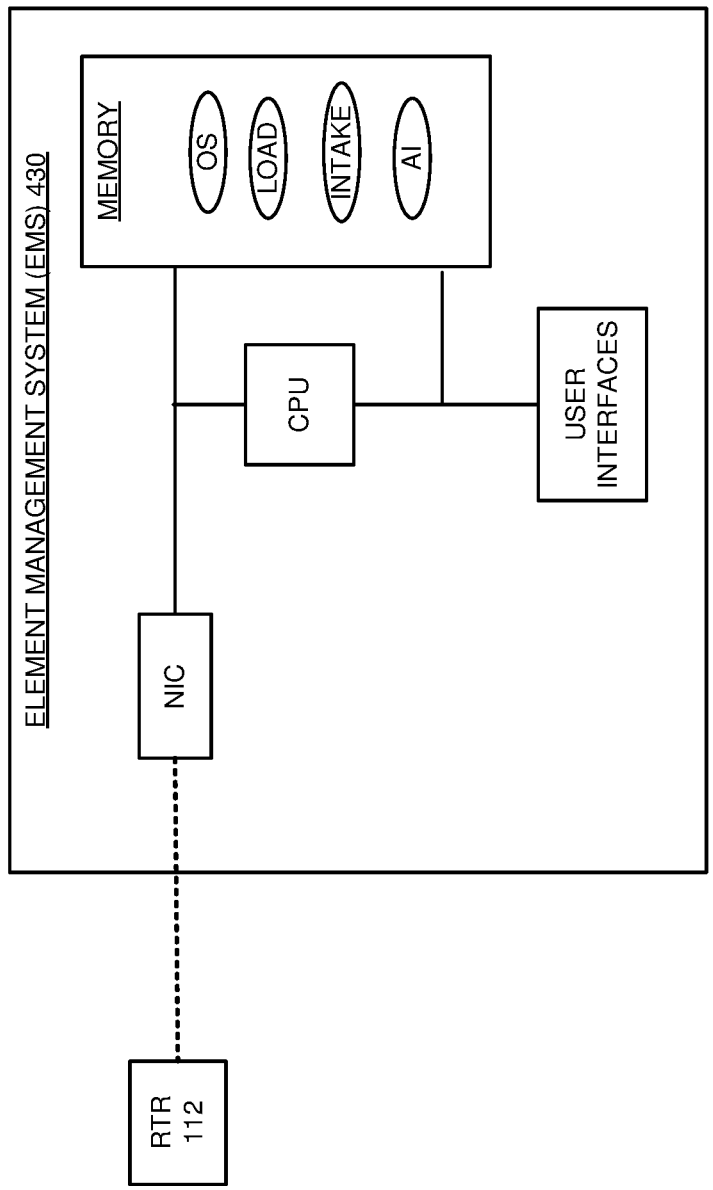
FIG. 6 illustrates the element management system that receives element status from the 5GNR gNodeB.

FIG. 6 illustrates EMS 430 that receives element status from 5GNR gNodeB 410. EMS 430 comprises an example of management circuitry 114, although element manager 114 may differ. EMS 430 comprises Network Interface Card (NIC), memory, CPU, and user interfaces that are coupled over bus circuitry. The memory stores an operating system and EMS applications like load manager, intake, and Artificial Intelligent networks (AI). The CPU in EMS 430 executes the operating system and EMS load application to track EMS load by transactions, memory capacity, or some other metric. The EMS load application translates the EMS load metrics into an EMS load integer between 0-100. The EMS load application transfers the EMS indicator to gNodeB 410 (and other network elements) over router 412. The EMS intake application receives, filters, and formats the event counts, threshold violations, and KPIs. The EMS intake application transfers the filtered and formatted counts, violations, and KPIs to the appropriate nodes in the EMS AI networks. The EMS AI networks process the counts, violations, and KPIs through their nodes and edges to generate useful intelligence from the inputs.

Figure 7:
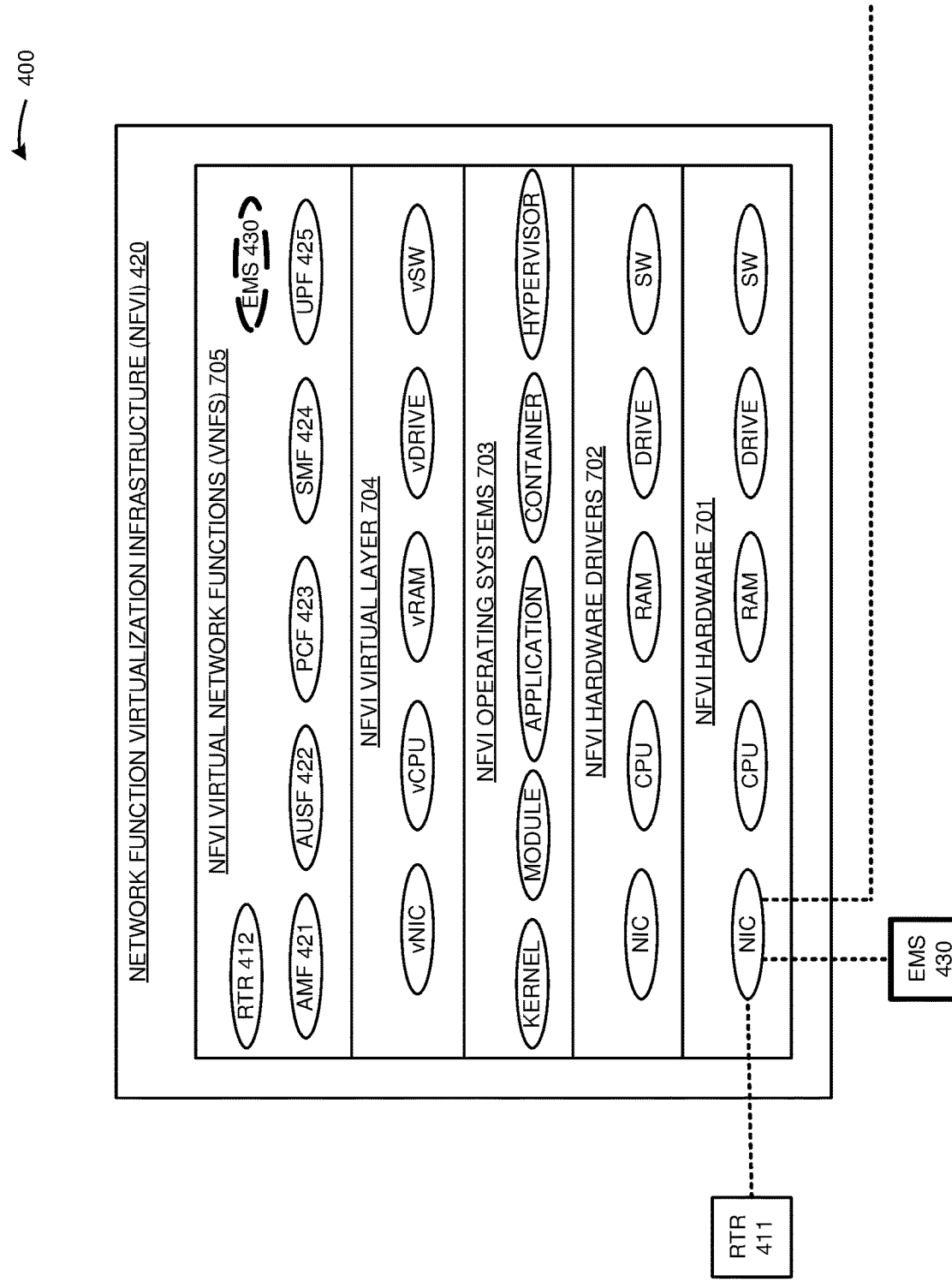
FIG. 7 illustrates a Network Function Virtualization Infrastructure (NFVI) in the 5G network.

FIG. 7 illustrates Network Function Virtualization Infrastructure (NFVI) 420 in 5G network 400. NFVI 420 comprises NFVI hardware 701, NFVI hardware drivers 702, NFVI operating systems 703, NFVI virtual layer 704, and NFVI Virtual Network Functions (VNFs) 705. NFVI hardware 701 comprises Network Interface Cards (NIC), CPU, RAM, flash/disk drives, and data switches (SW). NFVI hardware drivers 702 comprise software that is resident in the NIC, CPU, RAM, DRIVE, and SW. NFVI operating systems 703 comprise kernels, modules, applications, containers, hypervisors, and the like. NFVI virtual layer 704 comprises virtual NICs (vNIC), virtual CPUs (vCPU), virtual RAM (vRAM), virtual Drives (vDRIVE), and virtual Switches (vSW). NFVI VNFs 705 comprise router 412, AMF 421, AUSF 422, PCF 423, SMF 424, UPF 425, and possibly EMS 430. Other VNFs are typically present but are omitted for clarity. The NIC are coupled to router 411, EMS 430 (if external), and to external systems. NFVI hardware 701 executes NFVI hardware drivers 702, NFVI operating systems 703, NFVI virtual layer 704, and NFVI VNFs 705 to serve UEs 401-403. In some examples, VNFs 705 include EMS 430 which operates as described herein, although EMS 430 could be external to NFVI 420 in other examples.

Figure 8:
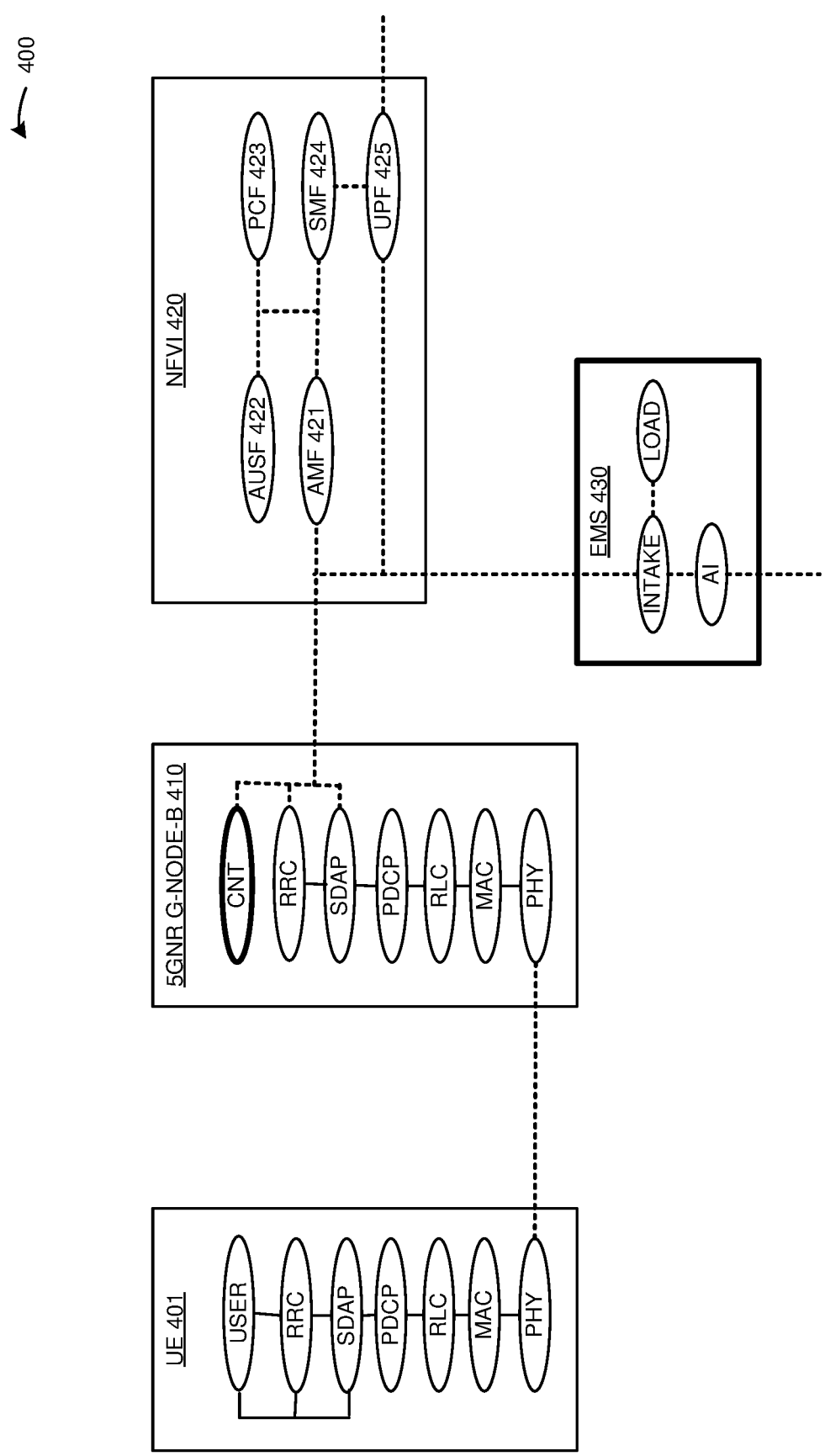
FIG. 8 illustrates an exemplary operation of the 5G network having the 5GNR gNodeB to indicate element status to the element management system.

FIG. 8 illustrates an exemplary operation of 5G network 400 having 5GNR gNodeB 410 to indicate element status to EMS 430. The user applications in UE 401 generate and consume data. The RRC in UE 401 wirelessly attaches to the RRC 5GNR gNodeB 410 over the 5GNR PDCPs, RLCs, MACs, and PHYs. The RRC in 5GNR gNodeB 410 and 5GC AMF 421 exchange N2 attachment signaling. 5GC AMF 421 exchanges 5GC signaling with 5GC AUSF 422, 5GC PCF 423, and 5GC SMF 424 to authenticate and authorize UE 401 and to select services and QoS for UE 401. 5GC SMF 424 signals UPF 425 to serve UE 401 over 5GNR gNodeB 410 per the QoS. 5GC AMF 421 signals the RRC in 5GNR gNodeB 410 to serve UE 401 per the QoS. The RRC in 5GNR gNodeB 410 signals the RRC in UE 401 over the PDCPs, RLCs, MACs, and PHYs to indicate the selected services and QoS. The SDAP in UE 401 and the SDAP in 5GNR gNodeB 410 wirelessly exchange data over the PDCPs, RLCs, MACs, and PHYs to deliver the selected services per the QoS. The SDAP in 5GNR gNodeB 410 and UPF 425 exchange the data to deliver the services per the QoS. UPF 425 exchanges the data with external systems to deliver the services per the QoS.

During the data exchanges, the components and software in 5GNR gNodeB 410 count events, detect threshold violations, and generate KPIs. The components and software transfer their counts, violations, and KPIs to the EMS controller (CNT). The EMS controller 410 stores individual reporting priorities for the individual event counts, threshold violations, and KPIs. The EMS controller receives the EMS indicator from EMS 430 that indicates transaction load other condition for EMS 430. Based on the EMS indicator, the EMS controller translates the individual reporting priorities for the individual event counts, threshold violations, and KPIs into individual reporting instructions for the individual event counts, threshold violations, and KPIs. The EMS controller transfers the individual event counts, threshold violations, and KPIs to EMS 430 per their individual reporting instructions. The reporting instructions may drive the EMS controller to report status data immediately, never, or later. The intake application in EMS 430 receives the event counts, threshold violations, and KPIs. The intake application filters and formats the event counts, threshold violations, and KPIs. The AI networks run the filtered and formatted counts, violations, and KPIs through the EMS AI nodes and edges to generate useful intelligence. The load application in EMS 430 determines EMS load and transfers a corresponding EMS indicator to the EMS controller in 5GNR gNodeB 410.

Figure 9:
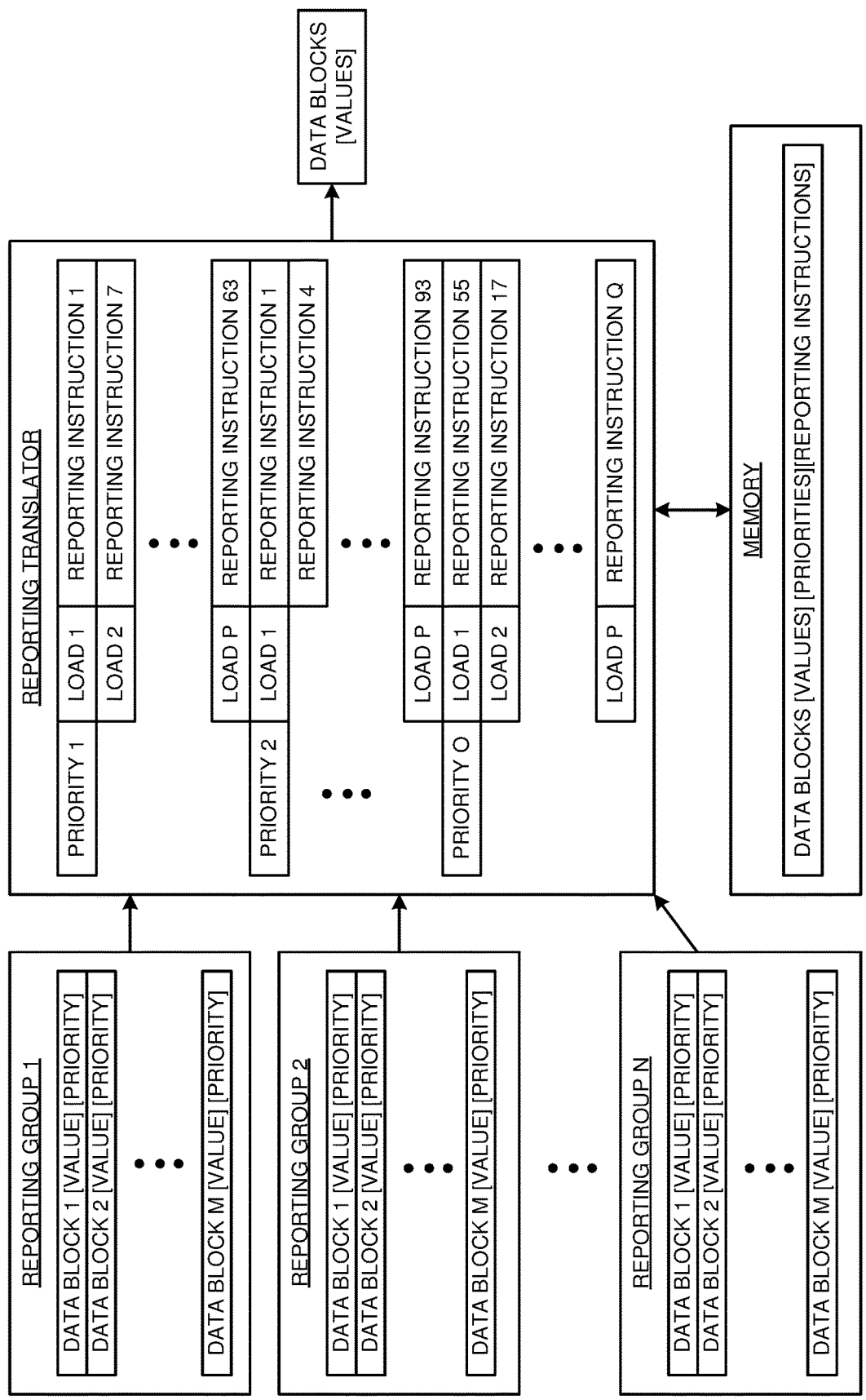
FIG. 9 illustrates an exemplary operation of the 5GNR gNodeB to indicate element status to the element management system.

FIG. 9 illustrates an exemplary operation of 5GNR gNodeB 410 to indicate element status to EMS 430. On the left of FIG. 9, reporting groups 1-N are shown. The reporting groups 1-N each comprise data blocks 1-M that have individual data values and reporting priorities. The data blocks comprise status indicators like event counts, threshold violations, KPIs, or some other gNodeB status indicator. The reporting translator has a data structure that correlates combinations of priorities 1-O and load values 1-P with reporting instructions 1-Q. For example, a data block having priority 1 when the EMS load is 2 would use reporting instruction 7. A data block having priority O when the EMS load is P would use reporting instruction Q. Some individual data blocks with their data values are transferred immediately based on their individual reporting instructions. Other data blocks and their data values are stored in the memory for subsequent transfer based on their individual reporting instructions.

The wireless data network circuitry described above comprises computer hardware and software that form special-purpose network circuitry to wirelessly serve UEs and transfer network element status to an element management system. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to wirelessly serve UEs and to transfer element status to the element management system.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to manage a wireless access node, the method comprising:
    the wireless access node wirelessly exchanging user data with wireless User Equipment (UEs) and exchanging the user data with one or more network elements;
    the wireless access node generating status indicators characterizing wireless access node operation during the user data exchanges;
    an Element Management System (EMS) determining EMS load based on EMS operation and transferring load data that indicates the EMS load for delivery to the wireless access node;
    the wireless access node receiving the load data transferred by the EMS;
    the wireless access node identifying individual priorities for individual ones of the status indicators;
    the wireless access node determining individual reporting times for the individual ones of the status indicators based on the load data and the individual priorities; and
    the wireless access node transferring the individual ones of the status indicators to the EMS per the individual reporting times.

2. The method of claim 1 wherein the wireless access node transferring the individual ones of the status indicators to the EMS per the individual reporting times comprises immediately transferring some of the status indicators.

3. The method of claim 1 wherein the wireless access node transferring the individual ones of the status indicators to the EMS per the individual reporting times comprises storing and subsequently transferring some of the status indicators.

4. The method of claim 1 wherein the load data is correlated to different ones of the individual reporting times.

5. The method of claim 1 wherein the load data comprises an integer that is correlated to different ones of the individual reporting times.

6. The method of claim 1 wherein some of the status indicators comprise wireless access node event counts.

7. The method of claim 1 wherein some of the status indicators comprise wireless access node threshold violations.

8. The method of claim 1 wherein some of the status indicators comprise wireless access node radio status.

9. The method of claim 1 wherein some of the status indicators comprise wireless access node antenna configurations.

10. The method of claim 1 wherein some of the status indicators comprise wireless access node data throughputs.

11. A wireless communication network to manage a wireless access node, the wireless communication network comprising:

the wireless access node configured to wirelessly exchange user data with wireless User Equipment (UEs) and exchange the user data with one or more network elements;

the wireless access node configured to generate status indicators characterizing wireless access node operation during the user data exchanges;

an Element Management System (EMS) configured to determine EMS load based on EMS operation and transfer load data that indicates the EMS load for delivery to the wireless access node;

the wireless access node configured to receive the load data transferred by the EMS;

the wireless access node configured to identify individual priorities for individual ones of the status indicators;

the wireless access node configured to determine individual reporting times for the individual ones of the status indicators based on the load data and the individual priorities; and the wireless access node configured to transfer the individual ones of the status indicators to the EMS per the individual reporting times.

12. The wireless communication network of claim 11 wherein the wireless access node is configured to immediately transfer some of the status indicators to transfer the individual ones of the status indicators to the EMS per the individual reporting times.

13. The wireless communication network of claim 11 wherein the wireless access node is configured to store and subsequently transfer some of the status indicators to transfer the individual ones of the status indicators to the EMS per the individual reporting times.

14. The wireless communication network of claim 11 wherein the load data is correlated to different ones of the individual reporting times.

15. The wireless communication network of claim 11 wherein the load data comprises an integer that is correlated to different ones of the individual reporting times.

16. The wireless communication network of claim 11 wherein some of the status indicators comprise wireless access node event counts.

17. The wireless communication network of claim 11 wherein some of the status indicators comprise wireless access node threshold violations.

18. The wireless communication network of claim 11 wherein some of the status indicators comprise wireless access node radio status.

19. The wireless communication network of claim 11 wherein some of the status indicators comprise wireless access node antenna configurations.

20. The wireless communication network of claim 11 wherein some of the status indicators comprise wireless access node data throughputs.

* * * * *